(12) United States Patent
Garcia (10) Patent No.: US 10,525,986 B2
(45) Date of Patent: Jan. 7, 2020

(54) SYSTEM AND METHOD FOR STEERING WHEEL HAPTIC NOTIFICATION

(71) Applicant: Harman International Industries, Incorporated, Stamford, CT (US)

(72) Inventor: Juan Garcia, Hoffman Estates, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/005,600

(22) Filed: Jun. 11, 2018

(65) Prior Publication Data

US 2019/0375431 A1  Dec. 12, 2019

(51) Int. Cl.
| | | |
|---|---|---|
| *B60W 50/16* | (2012.01) | |
| *B62D 1/06* | (2006.01) | |
| *B62D 6/00* | (2006.01) | |

(52) U.S. Cl.
CPC ............... *B60W 50/16* (2013.01); *B62D 1/06* (2013.01); *B62D 6/008* (2013.01); *B60W 2550/10* (2013.01)

(58) Field of Classification Search
CPC ..... B60W 50/16; B60W 2550/10; B62D 1/06; B62D 6/008
See application file for complete search history.

(56) References Cited

U.S. PATENT DOCUMENTS

| | | | | |
|---|---|---|---|---|
| 2009/0143941 | A1* | 6/2009 | Tarasinski | ............ A01D 41/127 701/41 |
| 2012/0046833 | A1* | 2/2012 | Sanma | ................... B62D 1/046 701/41 |
| 2012/0126965 | A1 | 5/2012 | Sanma | |
| 2015/0145659 | A1* | 5/2015 | Ishigami | ................. B60R 16/02 340/435 |
| 2015/0197283 | A1* | 7/2015 | Marti | .................... B62D 15/029 701/41 |
| 2015/0307022 | A1* | 10/2015 | Nelson | ................... B62D 1/046 701/36 |
| 2018/0273053 | A1* | 9/2018 | Ruemelin | ............. B60W 50/16 |

FOREIGN PATENT DOCUMENTS

| | | |
|---|---|---|
| DE | 10148535 A1 | 4/2003 |
| DE | 102015200907 A1 | 7/2016 |
| EP | 2907725 A2 | 8/2015 |

OTHER PUBLICATIONS

European Search Report for Application No. EP 19 17 9069, dated Nov. 5, 2019 (2 pages).

* cited by examiner

*Primary Examiner* — Mohamed Barakat
(74) *Attorney, Agent, or Firm* — Gordon & Rees LLP (57) ABSTRACT

The present disclosure relates to systems, devices and methods for steering wheel haptic notification. In one embodiment, a method includes receiving a detected hand position relative to a steering wheel of a vehicle and detecting at least one object relative to the vehicle. Based on the hand position, actuation of at least one haptic notification element of the steering wheel may be controlled to indicate position of the object. In certain embodiments, hand position may be detected by capacitive sensing of the steering wheel. In other embodiments, the vehicle may include an imaging device facing the steering wheel to determine hand position. Object location may be mapped to the steering wheel based on hand position. The actuators of the steering wheel may increase the steering wheel thickness or raise at least a portion of the actuator area to indicate the direction of a detected object.

20 Claims, 6 Drawing Sheets

SYSTEM AND METHOD FOR STEERING WHEEL HAPTIC NOTIFICATION

FIELD

The present disclosure relates to systems, methods and devices for vehicle generated notifications, and more particularly to steering wheel haptic notification.

BACKGROUND

Vehicles today can include visual indicators or auditory cues to provide driver feedback. Driver senses can be overloaded and looking at the indicators or listening for cues can become distracting. Existing elements often divert driver focus away from the road or direction of travel. Moreover, existing notifications usually provide a fixed alert condition, such as having an on state or an off state. These configurations do not allow for additional communication or dynamic communication with the driver. There exists a desire for vehicle components and configurations that allow for a vehicle to communicate to the driver.

BRIEF SUMMARY OF THE EMBODIMENTS

Disclosed and claimed herein are methods, devices and systems for steering wheel haptic notification. One embodiment is directed to a method that includes receiving, by a control unit of a vehicle, a detected hand position relative to a steering wheel of the vehicle. The method also includes detecting, by the control unit, at least one object relative to the vehicle. The method also includes controlling, by the control unit, actuation of at least one haptic notification element of the steering wheel based on the hand position to indicate position of the at least one object relative to the vehicle.

In one embodiment, the detected hand position is detected by at least one capacitive sensor of the steering wheel.

In one embodiment, the detected hand position is detected by an imaging unit of the vehicle.

In one embodiment, detection of the at least one object includes determining relative position of the object relative to the vehicle.

In one embodiment, actuation of at least one haptic notification element to indicate the position includes mapping the at least one object to the steering wheel.

In one embodiment, actuation of the at least one haptic notification element to indicate the position includes partial activation of the at least one haptic notification element, wherein the size and position of the actuation area of the haptic element indicates direction of the at least one object.

In one embodiment, actuation of the at least one haptic notification element to indicate the position includes controlling the outer surface of a portion of the steering wheel associated with the detected hand position, wherein the outer surface of the portion of the steering wheel is mechanically raised.

In one embodiment, actuation of the at least one haptic notification element to indicate the position is based on map profile generated for an operator of the vehicle, the map profile including at least one hand profile for the operator.

In one embodiment, the method includes updating actuation of the at least one haptic notification element in response to position change of the at least one object.

In one embodiment, the method includes updating actuation of the at least one haptic notification element in response to rotation of the steering wheel.

One embodiment is directed to a vehicle system including a haptic steering wheel including a plurality of haptic notification elements and a control unit. The control unit configured to receive a detected hand position relative to a steering wheel of the vehicle, detect at least one object relative to the vehicle, and control actuation of at least one haptic notification element of the steering wheel based on the hand position to indicate position of the at least one object relative to the vehicle.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to providing vehicle communication with a driver. Embodiments are directed to systems, methods and devices for steering wheel haptic notification. As will be discussed herein, principles of the disclosure allow for a vehicle to control actuation of a steering wheel having at least one haptic notification element based on driver hand position to indicate position of the at least one object relative to the vehicle. Haptic notification as discussed herein can allow for communication between a vehicle and a driver in an almost subconscious manner according to certain embodiments. By providing haptic notifications, driver sensory overload may be reduced.

According to certain embodiments, processes are provided for vehicle haptic notification. Haptic notification may be based on the position of an operator relative to a control device of the vehicle. In one embodiment, the position of driver hands on a steering wheel is detected and activation of steering wheel elements may be controlled dynamically to modify shape or output of the haptic actuator. In certain embodiments, hand position may be detected by one or more sensors of the vehicle control element. For example, a steering wheel in a vehicle may include at least one capacitive sensor to detect hand placement on the steering wheel, including the location, orientation, and portion of the hand in contact with the steering wheel. According to another embodiment, the haptic steering wheel may operate with an imaging system of the vehicle which optically detects the position of a driver's hands with respect to the vehicle control element.

Systems, device configurations and processes are provided to allow for haptic notification of one or more objects detected relative to vehicle. According to one embodiment, a vehicle system is provided which may be configured to detect one or more objects relative to the vehicle, including pedestrians, vehicles, and moving objects in general. Object detection as used herein may be based on one or more different types of sensors and sensing technology, such as optical imaging, LiDar, Radar, etc. The vehicle system may also be configured to detected stationary objects such as barriers within a detection area of the vehicle. As such, the systems and processes described herein may be used for one or more of a lane departure early warning (e.g., lane change assist, etc.), parking assistance, upcoming vehicle notification, stopping distance warning, and one or more vehicle operating conditions. By way of example, operations for haptic notification can include one or more of navigation, security, conveying the steepness of upcoming turns, lane mergers, blind spot alerts, countdown to turns, etc.

According to one embodiment, operations are provided for a surround view dynamically correlated actuation map (DCAM) steering wheel. A vehicle system is provided that allows for one or more elements of the vehicle to detect and generate a surround view of the vehicle using cameras mounted to the vehicle. The surround view may be used to detect one or more objects, track object position, and map the objects position relative to a vehicle to one or more elements of the steering wheel. Most drivers use at least one hand on a vehicle in one or more positions. Examples include using both hands at the 10 and 2 o'clock positions of the steering wheel. Another position can include the 3 and 9 o'clock positions. Based on the hand position, the actuators in those positions may be controlled to provide a haptic indication of a detected object.

Another aspect of the disclosure is directed to determining and communication of hand mapping data. Driver hand positions for a vehicle may be determined and stored in a driver profile. The driver profile may include multiple hand positions and/or preferences related to operation of the haptic system. Driver preferences may be generated and exchanged by way of a network connection among multiple vehicles. In addition, hand mapping data and characteristics may be provided to a vehicle to accommodate a driver.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
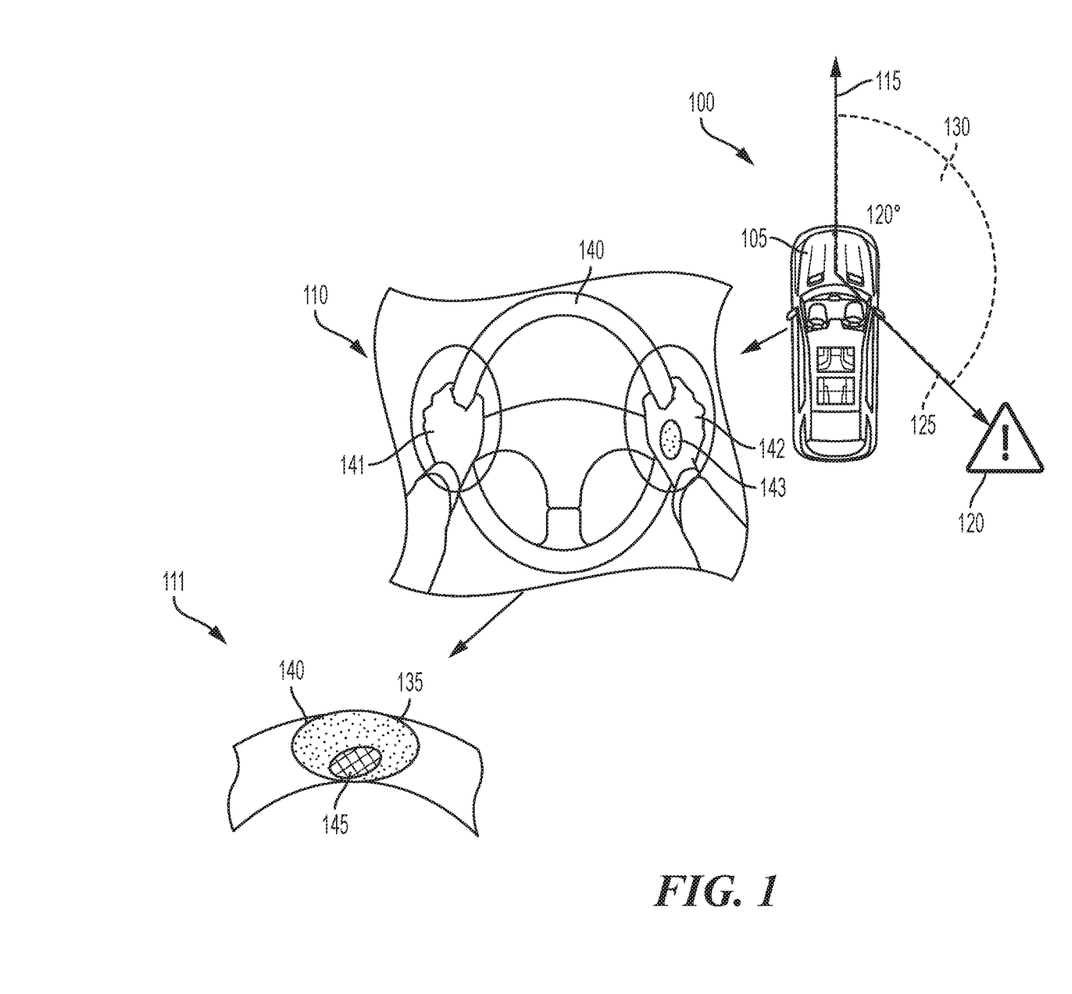
FIG. 1 depicts a graphical representation of steering wheel haptic notification for a vehicle according to one or more embodiments.

FIG. 1 depicts a graphical representation of a steering wheel haptic notification for a vehicle according to one or more embodiments. Systems, methods and device configurations are provided to allow for a vehicle to detect objects and control haptic notification by a control element of the vehicle, such as the steering wheel. As will be discussed herein, a steering wheel can include a plurality of actuation elements that can be controlled to provide proprioceptive changes that allow an operator to sense the position of an object relative to a vehicle.

FIG. 1 depicts system 100 including vehicle 105 and haptic steering wheel 110 according to one or more embodiments. As will be discussed herein, configurations are provided for a vehicle, such as vehicle 105, to allow for detection of objects, such as object 120, relative to vehicle 105. Systems and processes are also provided for detecting hand position relative to haptic steering wheel 110. According to one embodiment, steering wheel 110 includes a plurality of haptic areas that may be individually activated and controlled.

FIG. 1 illustrates an exemplary operating environment of a vehicle including object 120 located distance 125 and with angular displacement 130 (e.g., 130 degrees) from the vehicle heading 115. Vehicle heading 115 may relate to the forward facing direction of the vehicle. According to one embodiment, the position of object 120, or other objects detected, may be identified relative to heading 115 in order to determine the haptic output of steering wheel 110.

According to one embodiment, steering wheel 110 includes outer ring 140 which may include at least one haptic notification element. According to one embodiment, the haptic notification elements are located around the entire outer ring 140 and are controlled to rise to increase the thickness of the steering wheel. In one embodiment, the haptic notification elements are controlled based on the position of a driver's hands. As will be discussed in more detail below, the driver hands 141 and 142, and more importantly their position on outer ring 140 of steering wheel 110 may be detected. Based on hand position, at least one haptic notification element, shown as 143, that is collocated with a driver hand, such as driver hand 142, may be controlled. Hand position may relate to driver palms resting on outer ring 140, fingers curling around outer ring 140, or a combination.

FIG. 1 also shows an exemplary representation of haptic notification element 135 including an actuated portion 145. According to one embodiment, haptic notification element may be controlled to provide an indication of object 120. By way of example, actuated portion 145 is shown occupying a lower left portion of the haptic notification element to correspond to the lower left arrangement of object 120 to vehicle 105. Alternatively, if object 120 where to move to another relative position, haptic notification element 135 could change the actuated portion 145. Accordingly, actuation of haptic notification element 135 provides actuation of a portion of the notification element 135.

According to one embodiment, haptic notification element 135 includes one or more actuators, such as robotic actuators that can lift or extend the thickness of steering wheel outer ring 140. According to one embodiment, haptic notification element 135 can lift a finger or portion of the hand. According to another embodiment, and as will be discussed in more detail below, the actuation, length of actuation, amount of actuation and actuation pattern may be controlled for haptic notification element 135.

In one embodiment, haptic notification element 135 includes one or more mechanical elements that can raise the top surface (e.g., surface facing the driver) of steering wheel 110, the bottom surface of steering wheel 110, and/or lateral portions of outer ring 140.

Figure 5:
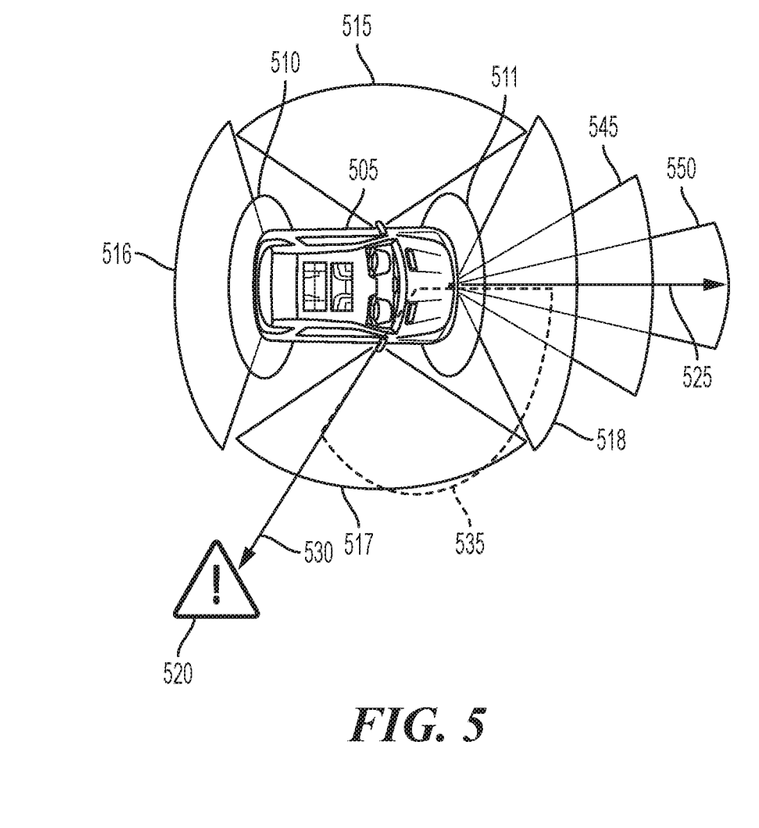
FIG. 5 depicts a graphical representation of vehicle object detection according to one or more embodiments.

According to another aspect, systems, devices and processes are provided to control the actuation of a haptic notification element, such as haptic notification element 135, in response to a change in the position of an object, such as object 120, rotation of the steering wheel, and change in hand position. System 100 may relate to a surround view dynamically correlated actuation map (DCAM) steering wheel system. System 100 can provide DCAM feedback of relative position of detected objects, such as object 120, detected within the vehicles surround view envelope to the steering wheels grip. Vehicle 105 may include at least one proximity sensor to detect objects. According to another embodiment, vehicle 105 may include at least one imaging device (e.g., camera, etc.) to detect objects. FIG. 5 illustrates exemplary detection zones of proximity sensors and a surround view elements of vehicle 105. At least one of sensors and of the surround view cameras of vehicle 105 can identify objects, provide data to determine the relative position (distance and direction) of the object to the vehicle. In certain embodiments, system 100 is configured to provide a haptic feedback of object location even while steering wheel 110 is being turned. System 100 may be configured to map relative position of objects to the steering 110. As such, system 100 overcomes drawbacks of notification systems which require the drive to take eyes off the road. In that fashion, system 100 can be employed for driving operations, such as lane assist. System 100 can also function to provide notifications to for proximity detection, such as to provide an indication of wheel curb, another vehicles bumper, or objects close to the vehicle.

According to one embodiment, system 100 may employ a shape shifting steering wheel 110. Steering wheel 110 may be configured to change thickness of one or more sections dynamically to provide driver feedback. According to one embodiment, sections of the steering wheel 110 may be activated, such that not all haptic elements of the steering wheel are actuated at the same time. Activating portions of steering wheel 110 can provide an indication of object position. In addition, by providing functionality to activate a portion of the steering wheel, feedback is directed to the position of a driver's hands.

System 100 may be configured to perform one or more operations to control shape of steering wheel 110. In one embodiment, system 100 is configured to operate with one or more platform application programming interfaces (APIs) to allow for control and modification of change and in what shape.

According to one embodiment, system 100 may be configured to determine hand profiles of a driver. By way of example, system 100 may detect the locations that a driver usually operates a vehicle, or positions that are used by the driver. In addition, the system may detect how the driver's hands, such as hands 141 and 142 contact steering wheel 110. The hand profile may allow for better actuation and feedback of object location. In certain embodiments system 100 may allow for sharing of hand profile data among vehicles and other devices.

Figure 2:
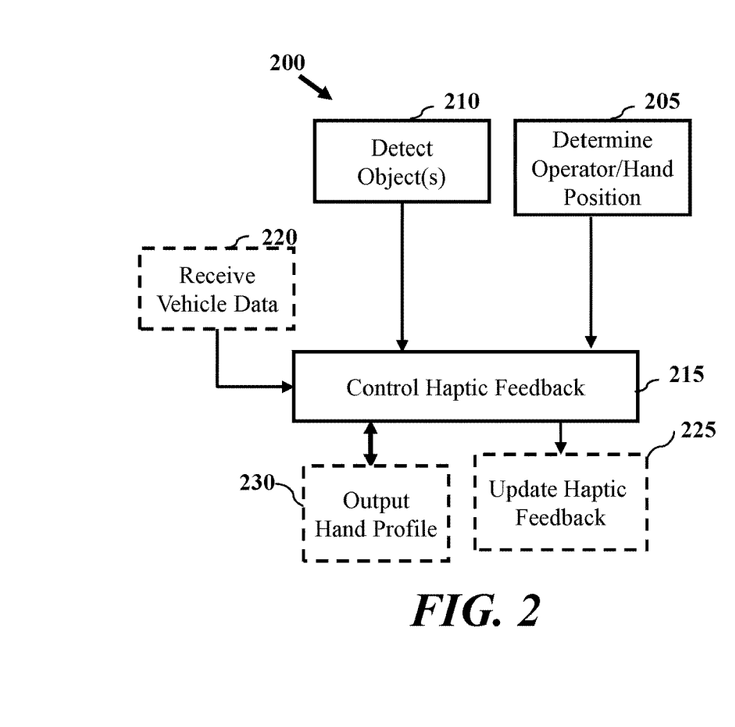
FIG. 2 depicts a process for steering wheel haptic notification according to one or more embodiments.

FIG. 2 depicts a process for steering wheel haptic notification according to one or more embodiments. According to one embodiment, process 200 controls a steering wheel (e.g., steering wheel 110) of a vehicle (e.g., vehicle 105) in response to hands of a vehicle operator and objects in proximity to the vehicle. Process 200 may be performed by a control unit (e.g., control unit 305 of FIG. 3, control unit 406 of FIG. 4) or other devices within a vehicle. Process 200 may provide several benefits, including the ability to effectively provide a notification of object position to a vehicle operator without having the operator look at a display.

According to one embodiment, process 200 is configured to provide haptic notification in response to detected objects. Object detection may be based on one or more proximity sensors of the vehicle and/or a surround view system of the vehicle. Haptic notification may also be provided based on hand position of the operator. In one embodiment, process 200 determines operator hand position at block 205. A control unit of the vehicle may receive a determine hand position from one or more vehicle elements. In one embodiment, the steering wheel (e.g. steering wheel 110) includes at least one capacitive sensor configured to detect hand position. Capacitance may be sensed across a two dimension array of the steering wheel.

According to another embodiment, a vehicle system may include one or more imaging devices to determine hand position based on image data captured within the vehicle. Hand position is determined to identify whether one or both hands are in contact with the steering wheel. In addition, the orientation or placement of each hand is determined. A control unit may map the hand position to one or more actuation elements. Determining hand position can also include detecting changes in hand position, release of the steering wheel, and movement to another position. Operations at block 205 may allow for mapping and interpretation of driver hand position. As hands are curved objects, a non-uniform shape will be applied to the steering wheel.

At block 210, process 200 detects at least one object relative to the vehicle. A control unit can detect objects using one or more of a proximity sensors and surround view imaging system. Objects detected by vehicle systems may be provided to the control unit to determine objects which require notification. For lane assist operations, the control unit may provide indications for approaching vehicles, or vehicles in adjacent lanes. For parking operations, the notifications may be provided for approach vehicles, stationary objects and hazards. For each object, detection includes determining relative position of the object relative to the vehicle. The relative position is determined in order to map the objects position to the steering wheel actuation elements.

Operations at blocks 205 and 210 may be performed separately and at during the same time periods and non-overlapping time periods. In some instances, an object will be detected prior to determining hand position. Similarly, hand position may be determined prior to detection of an object. In other situations, object position and a new hand position may be determined concurrently.

At block 215, process 200 includes control of haptic feedback. In one embodiment, controlling actuation of at least one haptic notification element of the steering wheel is based on the hand position and indicates position of the at least one object relative to the vehicle. Thus, in contrast to simply providing a haptic notification, haptic feedback at block 215 includes indication of object location. In one embodiment, actuation of at least one haptic notification element to indicate the position includes mapping the at least one object to the steering wheel. The object position determined relative to the vehicle provides the distance and angular offset from the vehicles heading. The relative position may be indicated by controlling how the actuation element is controlled. In one embodiment, actuation of the at least one haptic notification element to indicate the position includes partial activation of the at least one haptic notification element. Partial actuation may include controlling the size and position of the actuation area of the haptic element to indicate direction of the at least one object. By way of example, in FIG. 1, an actuated portion 145 of haptic notification element 135 results in a bulge or protrusion that is only a portion of the notification element 135. Actuation of the at least one haptic notification element at block 215 can include controlling the outer surface of a portion of the steering wheel associated with the detected hand position. In certain embodiments, actuated portion 145 of haptic notification element 135 may relate to an outer surface of the portion of the steering wheel is mechanically raised.

In one embodiment, actuation of the at least one haptic notification element to indicate the position is based on map profile generated for an operator of the vehicle. Each operator may place have characteristics hand placement, such that actuators may be controlled relative to one or more of hand size, hand position, and contact area with a steering wheel.

According to one embodiment, process 200 may optionally receive vehicle data at block 220. In one embodiment, vehicle data such as acceleration, speed, or changes to drive element may signal a type of operation. For example, a gear change from park to reverse, or drive to reverse may indicate a parking operation. Alternatively, vehicle speed may indicate highway driving. Based on vehicle operating conditions identified from vehicle data received at optional block 220 haptic actuation may be controlled.

Figure 7A:
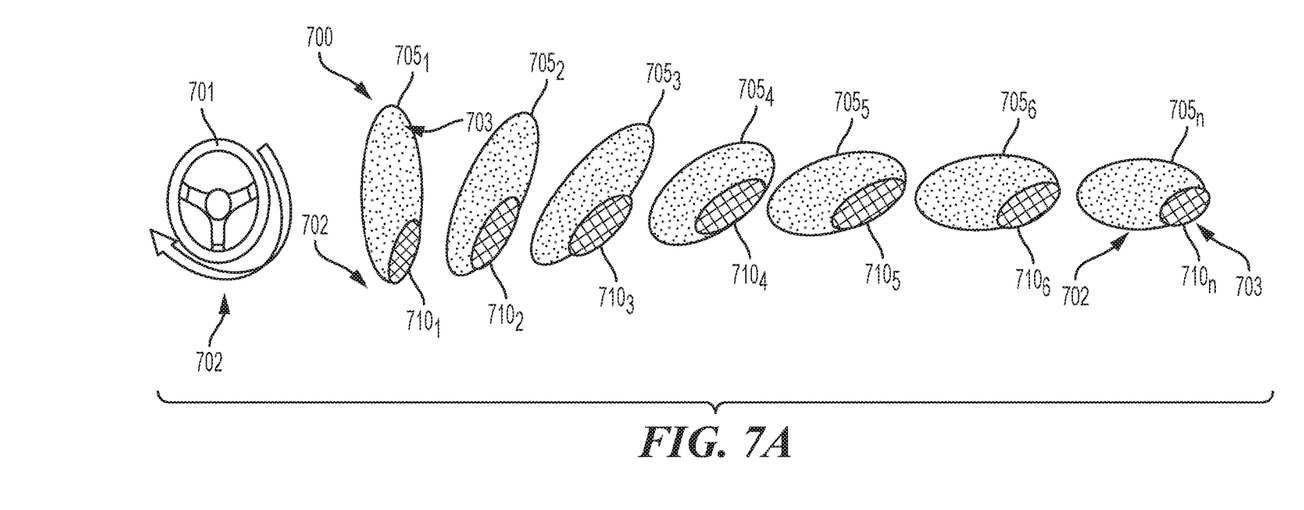
FIGS. 7A-7B depict graphical representations of steering wheel actuation according to one or more embodiments.
Figure 7B:
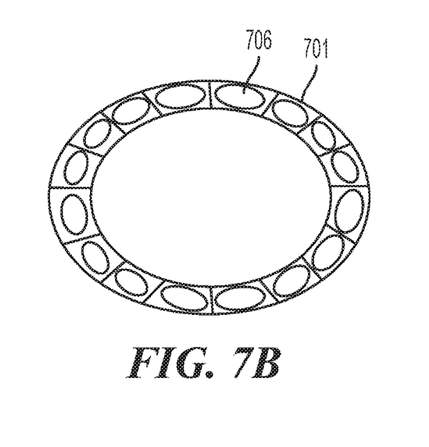

According to one embodiment, process 200 may optionally update haptic feedback at block 225. In one embodiment, updating actuation of the at least one haptic notification element may be in response to changes in hand position, changes in object position, and/or steering wheel position. In response to position change of the at least one object, for example, the actuation area of a haptic element may be controlled to move to signal object movement or position change. In one embodiment, updating actuation of the at least one haptic notification element in response to rotation of the steering wheel, such that the actuated portion of the actuation element may be modified to identify relative object position as the steering wheel is turned. FIGS. 7A-7B show steering wheel operation and actuation of a haptic element according to one or more embodiments.

In one embodiment, output haptic feedback is an alert or notification by activating a portion of the haptic region associated with the hand position. Actuation of the portion of the haptic element signals location of an object. Updating at block 215 can include changing the size or percent of the haptic region indicated. For example, size of the haptic region indicated may be increase based on proximity, size of the object or potential harm.

According to one embodiment, process 200 may optionally output a hand profile at block 230. Operator hand profiles may be determined and shared by a control unit to allow for use of the hand profile across different vehicles. In addition, the hand profiles may enable more accurate output and control of the haptic elements. At optional block 230, a hand profile including one or more of hand size, hand positions, and surface area in contact with a steering wheel can be stored.

In one embodiment, hand profile can indicate hand size, hand area applied to the steering wheel, frequently used hand positions, etc. By way of example the hand profile may include a profile for hand position while driving straight, hand positions while turning and hand positions while maneuvering, such as parallel parking, reversing. The hand profile may also describe how a particular drives hand rests on a aa particular vehicle wheel such that the actuation of haptic elements may be controller to provide alerts that may be detected by the user.

The driver profile may be shared and used to control vehicle operation. According to one embodiment, control at block 215 may be based on a driver profile. In other embodiments, control at block 215 may be based on a vehicle configuration. For example, a vehicle with a larger steering wheel (e.g., full size pick up) may have different sized or a different number of actuation elements compared to a vehicle with a smaller steering wheel (e.g., sports car). According to steering wheel size, the actuation elements may be selected and controlled.

Process 200 may be used with one or more vehicle operations including but not limited to lane departure early warning (and lane change assist, lane keeping assist) systems, vehicle parking systems, driver assist systems and navigation systems.

Figure 3:
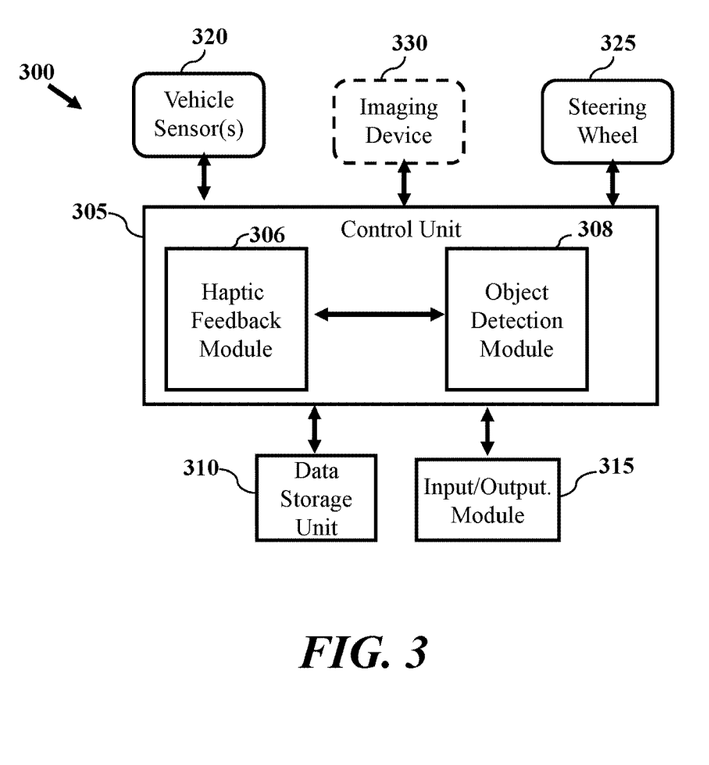
FIG. 3 depicts a graphical representation of a control unit according to one or more embodiments.

FIG. 3 depicts a graphical representation of a control unit according to one or more embodiments. According to one embodiment, a vehicle (e.g., vehicle 105) includes a control unit 305 which may be configured to interface with one or more vehicle components. According to another embodiment, control unit 305 may be configured to perform one or more processes and functions described herein, such as process 200 of FIG. 2. Control unit 305 may relate to a control unit of a vehicle navigation unit or assistive driving module.

In an exemplary embodiment, control unit 305 includes one or more elements or modules. FIG. 3 shows control unit 305 including a haptic feedback module 306 and object detection module 308. Modules of control unit 305 may be configured to perform functions for one or more of lane assistance, parking assistance and to provide driver notifications. Control unit 305 is configured to for interface with one or more vehicle components. One or more executable instructions may be stored by data storage 310. Control unit 305 may receive data for the vehicle, object data, and data in general from input/output module 310. Input/output module 315 may be configured to interface with vehicle components and/or other vehicles. Control unit 305 may be configured to communicate with vehicle sensors 320 including an ECU, surround view cameras, and/or proximity sensors.

System 300 may relate to a vehicle system including a haptic steering wheel 325. Steering wheel 325 may include plurality of haptic notification elements. In one embodiment, control unit 305 is configured to receive a detected hand position relative to steering wheel 325 for a driver. Haptic feedback module 306 may be configured to receive detected hand position. In certain embodiments, hand position is detected by one or more capacitive sensors of steering wheel 325. According to another other embodiment, hand position may be determined by imaging device 330 which may provide hand position to haptic feedback module 306. Imaging device 330 may be an optical imaging device configured to detect hand position, hand movement, steering wheel rotation.

Control unit 305 may detect at least one object relative to the vehicle based on information provided by vehicle sensors. Object detection module 308 may receive sensor data and identify one or more objects of interest. Controlling actuation of at least one haptic notification element of the steering wheel may be directed by haptic feedback module 306 based on the hand position to indicate position of the at least one object relative to the vehicle.

According to one embodiment, haptic feedback module 306 and object detection module 308 each represent one or more functional and hardware elements of control unit 305 that may be configured to control steering wheel 325 and haptic actuation elements of the steering wheel. Control unit 305 may monitor vehicle operating and output control signals to steering wheel 325 for haptic notification.

Control unit 305 may relate to a controller or processor. Control unit 305 may execute code stored in data storage 310. In certain embodiments, data storage 310 includes non-transitory data. Data storage 310 may provide mapping information for steering 325, at least one driver hand profile, and object information.

Figure 4:
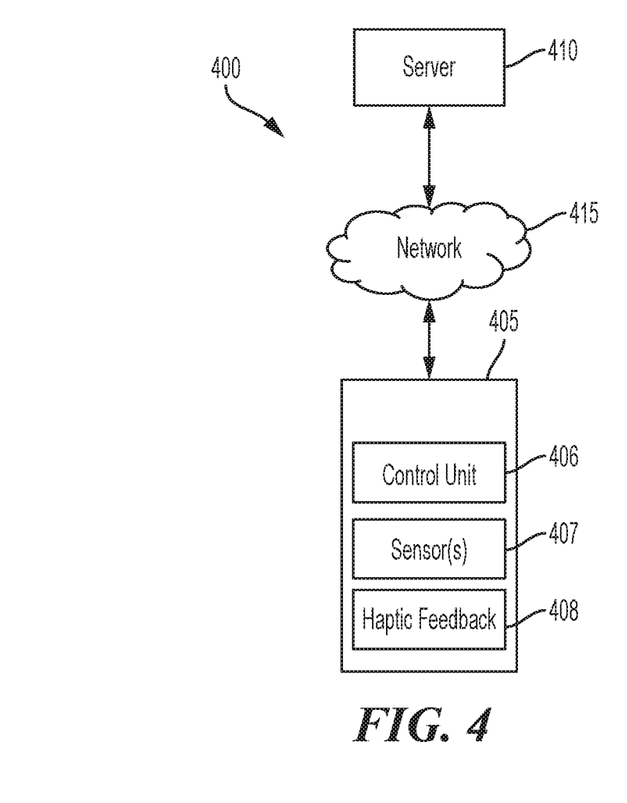
FIG. 4 depicts a graphical representation of a system configuration according to one or more embodiments.

FIG. 4 depicts a graphical representation of a system configuration according to one or more embodiments. According to one embodiment, system 400 allows for vehicle 405 to receive data from one or more sources. According to another embodiment, system 400 allows for hand profile data to be exchanged relative to one or more vehicles. In an exemplary embodiment, system 400 provides data to vehicle 405 from a network entity, such as server 410 by way of communications network 415. Vehicle 405 may be configured to output hand profile information for server 410 by way of communications network 415.

FIG. 4 shows vehicle 405 including control unit 406 and one or more sensors 407. Vehicle 405 also includes haptic feedback. According to one embodiment haptic feedback of vehicle 405 includes a steering wheel with one or more actuated regions. According to another embodiment haptic feedback may include one or more control surfaces including haptic control elements. By way of example, vehicle 405 may include haptic elements included in a manual gear shift, control knob, or control element in general that typically include user contact. According to another embodiment haptic feedback 408 may be provided to one or more portions of a vehicle seat, such that individual elements of the seat may be controlled to indicate object location relative to the vehicle.

Vehicle 405 may employ a system of sensors, such as one or more of Lidar, radar, imagining, etc. Sensors 407 may also include imaging devices configured to provide a surround view for the vehicle.

FIG. 5 depicts a graphical representation of vehicle object detection according to one or more embodiments. According to one embodiment, vehicle 505 may detect objects by one or more of proximity sensors and surround view imaging devices. FIG. 5 shows examples of sensor detection areas and object location.

According to one embodiment, vehicle 505 includes proximity sensors to detect objects in zone 510 associated with the vehicle rear bumper and zone 511 associated with the vehicle front bumper. Zones 510 and 511 are exemplary and allow for detection of objects in close proximity, such as within 5 feet (e.g., 1.5 m) from the vehicle to prevent collision detection. In certain embodiments, zones 510 and 511 may allow for curb detection to assist in parking. Zones 510 and 511 may also be used for collision avoidance in come embodiments. Vehicle 505 may also provide object detection associated with zone 515 for vehicle side (e.g., driver side) zone 516 for vehicle rear, zone 517 for vehicle side (e.g., passenger side) and zone 518 for the vehicle front. Zones 515-518 may be detected by proximity sensors in one embodiment. According to another embodiment zones 515-518 may be provided by a vehicle surround view system including one or more imaging devices. Vehicle 505 may also detect one or more extended zones, such as zone 545 and 550 extending in front of the vehicle.

According to one embodiment, object detection may be determined relative to a point of reference of the vehicle. According to one embodiment, direction 525 relates to a reference direction for vehicle 505 which may be used as a reference for detection of objects, such as object 520. Object distance shown as 535 and the object position 535 may be determined relative to reference 525.

According to one embodiment, detection areas allow for triggering haptic elements, such as steering wheel haptic elements, when objects become close or exceeding stopping distance of the vehicle. Objects detected by the system can include, and are not limited to vehicles, pedestrians, hazards, curbs, barriers, etc. The detection areas of the surround view envelope may be mapped to locations on a steering wheel. Thus, blind points or objects may be indicated even in the driver is not looking at the vehicle display or rear view mirror.

Figure 6A:
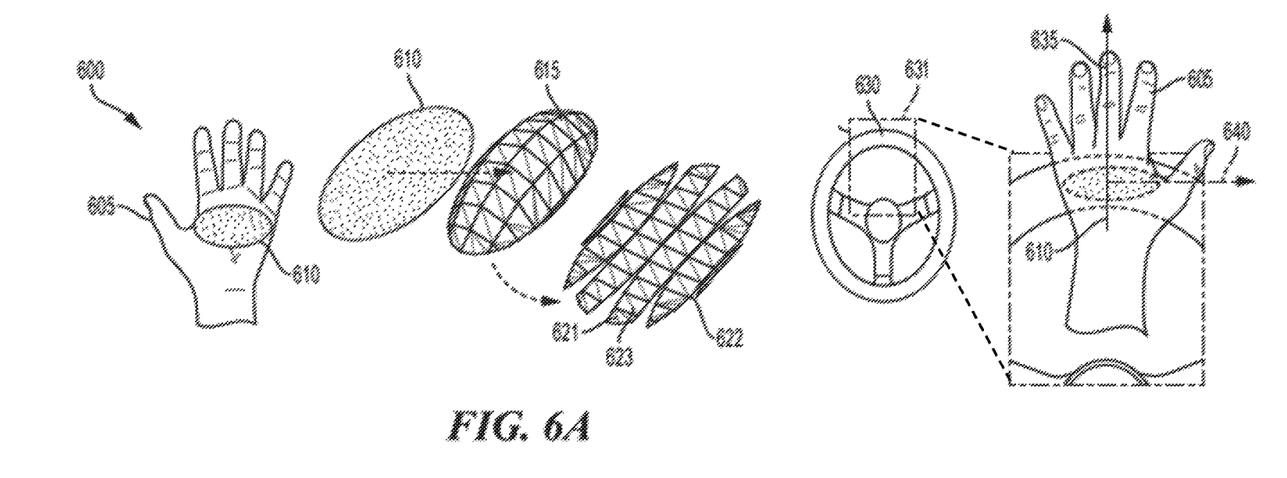
FIGS. 6A-6B depict a graphical representation of steering wheel actuation areas according to one or more embodiments.
Figure 6B:
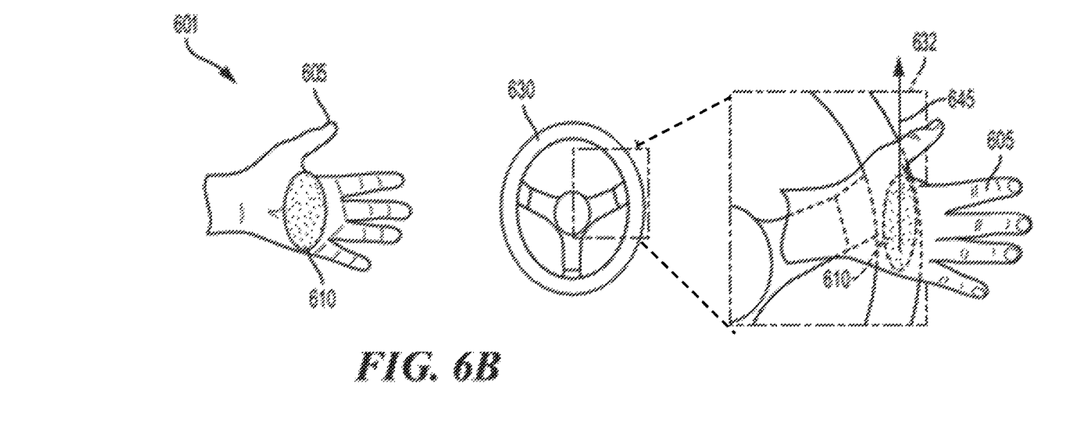

FIGS. 6A-6B depict a graphical representation of steering wheel actuation areas according to one or more embodiments. Referring first to FIG. 6A, configuration 600 is provided for haptic notification elements. A haptic notification element 610 is shown relative to hand 605. According to one embodiment, haptic notification element 610 relates to an area of a steering wheel (e.g., steering wheel 110) that may be raised, lowered, or change shape based on one or more controls. In certain embodiments, haptic notification element 610 may be configured to change texture, such as a surface feature. Haptic notification element 610 is shown in a raised position 615, and a flattened sectional representation 621. According to one embodiment, the entire haptic notification element 610 may be positioned in a raised format, such that a bubble or raised profile is provided. In other embodiments, only a portion of haptic notification element 610 is raised into a bubble or raised feature. Haptic notification element 610 may be configured to be raised to multiple heights. In certain embodiments a first raised height may indicate the presence of an object. A second raised height (higher than the first) may be actuated for haptic notification element 610 to indicate closer proximity to a detected object.

According to one embodiment, haptic notification element 610 includes a plurality of actuation areas, such as actuation areas 621, 622 and 623. According to one embodiment, actuation areas of haptic notification element 610 may be activated individually or in combination.

Configuration 600 includes a plurality of haptic notification elements, such as haptic notification element 610 on steering wheel 630. Steering wheel portion 631 of steering wheel 630 may be actuated to raise one or more actuation areas of haptic notification element 610 relative to hand 605. According to one embodiment, actuation may be based on the position of hand 605. Hand position may be determined to include location, as well as hand reference plan 635 and a central axis 640 of haptic notification element 610.

According to one embodiment, haptic notification may be provided based on a hand profile and/or detected hand position. Configuration 600 shows an exemplary configuration that can be applied to driving positions, such as a 10-2 o'clock position, or 4-5 o'clock position (where 0 degrees=12 o'clock).

where the hands of the driver are located in generally these positions on the steering wheel. In addition haptic elements may be located on positions of the steering wheel and spaced according to positions specific for each steering wheel.

According to one embodiment, control of configuration 600 may be based on hand profiles of a driver. Processes are provided herein for detecting and actuating based on hand position and location. By way of example, the locations that a driver usually operates a vehicle are detected, or positions that are used by the driver. In addition, the system may detect how the driver's hands (e.g., hands 141 and 142) contact steering wheel 630. The hand profile may allow for better actuation and feedback of object location.

FIG. 6B depicts configuration 601 where hand 605 and haptic notification element 610 relate to another location of the steering wheel 630. Steering wheel portion 632 of steering wheel 630 may be actuated to raise one or more actuation areas of haptic notification element 610 relative to hand 605. According to one embodiment, actuation may be based on the position of hand 605. Hand position may be determined to include location, as well as hand reference plane 645 and haptic notification element 610.

In order to configurations 600 and 601 to operate, a vehicle system can detect hand position and orientation (HPO) on steering wheel 630. As discussed herein, hand position may be detected by capacitive sensors, as such steering wheel may include at least one capacitive sensor to detect and output location of at least one driver hand. Capacitive multi-touch surface sensors may be employed. In certain embodiments, the capacitive sensors are co-located with haptic notification elements. According to another embodiment a vehicle system may employ optical imaging of the steering wheel 630 to detect position of hand 605. Video based systems can detect hand 605 on steering wheel 630 and then determine position and orientation of a notification element of haptic notification element 610. Once HPO is assured, then the haptic notification element 610 can be dynamically mapped a new actuation profile to the HPO.

FIGS. 7A-7B depict graphical representations of steering wheel actuation according to one or more embodiments. According to one embodiment, haptic notification elements of steering wheel 701 may be controlled based on hand position and object location. FIG. 7A shows an exemplary operation where rotation of steering wheel 701 in direction 702 causes the haptic notification element $705_{1-n}$ to be updated, and in particular for the actuation area $710_{1-n}$ of the notification element to be modified. Because location is identified relative to the position of the driver, rotation of the steering wheel may require that activated elements be modified to impart direction of a detected object. FIG. 7A illustrates how haptic notification element $705_{1-n}$ rotates. According to one embodiment, the size and location of actuation area $710_{1-n}$ is adjusted to move from a first area 702 to a second area 703 of the actuation element. The actuation element $705_{1-n}$ is the same element and is shown as it rotates.

According to one embodiment, steering wheel 701 is a shape shifting steering wheel that can change thickness dynamically. Steering wheel 701 allows a vehicle to communicate with the driver in an almost subconscious way and can reduce driver sensory overload. Steering wheel 701 may change thickness dynamically covering information through the driver's fingertips. Steering wheel 701 can include robotic actuators configured to lift each finger separately or in combination. The thickness change is perceived via proprioception to allow the driver to feel the size and shape of objects without looking (different from vibration).

In certain embodiments, after haptic feedback is provided to the driver through the steering wheel 701, the vehicle system can ask for user feedback on accuracy of actuation. The feedback can be used to tailor where the actuation needs to occur. Successful adjustment of APM can be correlated to driver profile and then used to classify various types of "hand" profiles. These hand profiles could then be shared across the cloud for other subsequent first time users. This way, the system is applying best guess hand profiles based on early predictions of driver profiles. Depending on driver preference, the actuation area calculation can include current steering wheel angle. When the driver is turning the steering wheel and their hand remains in position, the actuation area stays relative to the absolute angle to normal.

FIG. 7B shows steering wheel 701 including a plurality of haptic notification elements, such as haptic notification element 706. Haptic notification elements may be positioned along the entire outer ring of steering wheel 701. In certain embodiments, the haptic notification elements protrude out towards the top surface of steering wheel 701 facing the driver. In other embodiments, haptic notification elements extend away from the driver on an opposite surface of steering wheel 701 towards the located of a driver's fingers. Steering wheel 701 may be configured to actuated top and or bottom surface elements according to one or more embodiments.

Figure 8:
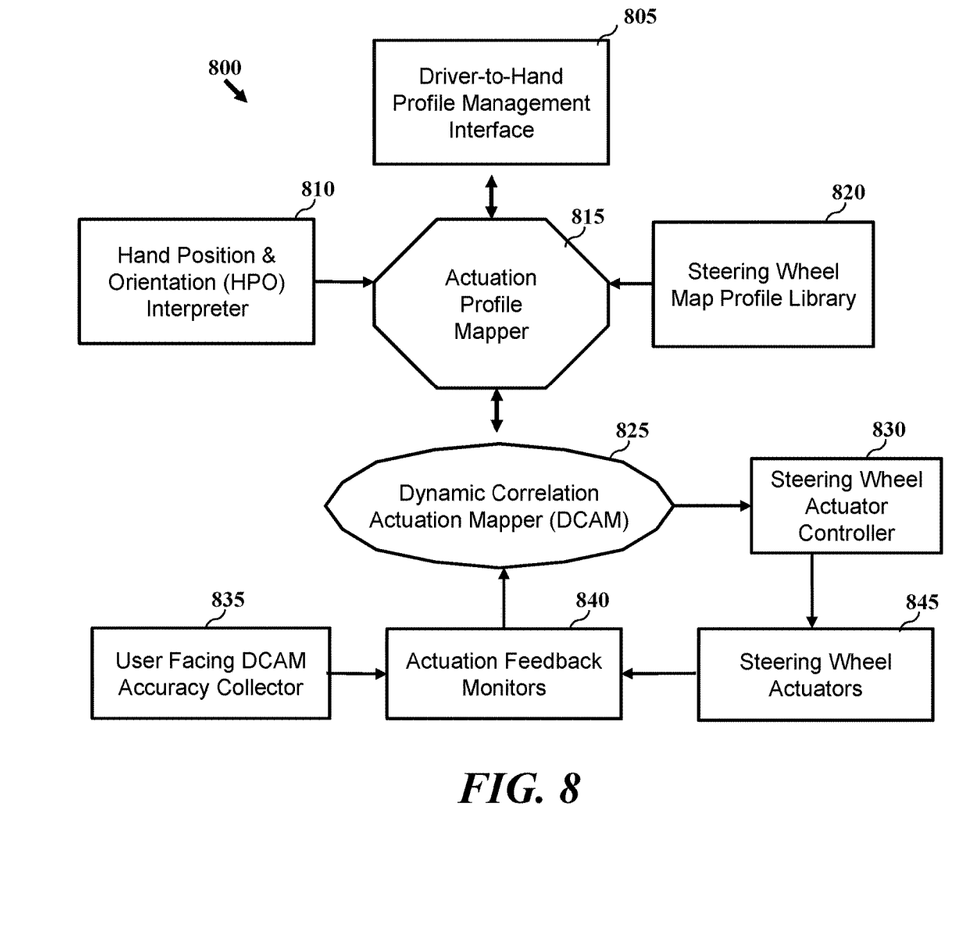
FIG. 8 depicts a graphical representation of operations according to one or more embodiments.

FIG. 8 depicts a graphical representation of operations according to one or more embodiments. According to one embodiment, one or more operations of a vehicle system and steering wheel actuation may include operations. Process 800 shows exemplary operations that may be performed by a control unit for haptic element control. According to one embodiment, a driver to hand profile management interface 805 may provide control data regarding hand profiles that may be used for actuation. On initial use of the system a standard hand profile may be generated by driver to hand profile management interface 805 to an actuation profile mapper 815. Hand position and orientation (HPO) interpreter determines hand position or positions on a steering wheel, such as the current hand position and provided the HPO to actuation profile mapper 815. Based on hand position and a hand profile, actuation profile mapper 815 can select notification elements of a haptic steering wheel. Actuation profile mapper (APM) 815 may also use a steering wheel map profile library 820 to generate control signals based on a particular steering wheel and type of haptic element. APM 815 accepts a steering wheel map from steering wheel map profile library 820. Actuation profile mapper 815 can provide the notification elements that are available and any hand profile information to a dynamic correlation actuation mapper (DCAM) 825. Actuation profile mapper 815 is confirmed prior to actuation of the steering wheel when a proximity hazard is detected.

According to one embodiment, DCAM 825 maps object position to a steering wheel and outputs control commands to steering wheel controller 830 to actuate one or more haptic elements by steering wheel actuators 845. DCAM 825 can find location with the hand orientation and position in the HPO interpreter 810, such that hand shape, position and orientation of the haptic elements are properly actuated.

According to one embodiment, a vehicle may employ one or more accuracy monitors for DCAM operation, including a user facing DCAM accuracy collector 835 which outputs accuracy data to actuation feedback monitors 840. User facing DCAM accuracy collector 835 may be a steering wheel facing camera to detect where hand in the steering wheel position. In certain embodiments, a capacitive sensor or vehicle bus data may be used to may detect steering wheel orientation. Actuation feedback monitors also receives the actuation data from steering wheel actuators 845 and provide corrections to DCAM 825.

After DCAM feedback is delivered to the driver through the steering wheel, the system can ask for user feedback on accuracy of actuation. This feedback can be used to tailor where the actuation needs to occur. Successful adjustment of APM can be correlated to driver profile and then used to classify various types of "hand" profiles. These hand profiles could then be shared across the cloud for other subsequent first-time users. This way, the system is applying best-guess hand profiles based on early predictions of driver profiles.

Depending on driver preference, the Actuation Area calculation can include current steering wheel angle. When the driver is turning the steering wheel and their hand remains in position, the Actuation Area stays relative to the absolute angle to normal.

While this disclosure has been particularly shown and described with references to exemplary embodiments thereof, it will be understood by those skilled in the art that various changes in form and details may be made therein without departing from the scope of the claimed embodiments.

What is claimed is:

1. A method for steering wheel haptic notification, the method comprising:
   receiving, by a control unit of a vehicle, a detected hand position relative to a steering wheel of the vehicle;
   detecting, by the control unit, at least one object relative to the vehicle; and
   controlling, by the control unit, actuation of at least one haptic notification element of the steering wheel based on the hand position to indicate position of the at least one object relative to the vehicle, the haptic notification element including a plurality of actuation areas configured to be positioned to a raised height, wherein actuation of the at least one haptic notification element includes partial activation of the haptic notification element to control size and position of an actuation area of the haptic element, wherein the size and position of the actuation area of the at least one haptic notification element indicates direction of the at least one object.

2. The method of claim 1, wherein the detected hand position is detected by at least one capacitive sensor of the steering wheel.

3. The method of claim 1, wherein the detected hand position is detected by an imaging unit of the vehicle.

4. The method of claim 1, wherein detection of the at least one object includes determining relative position of the object relative to the vehicle.

5. The method of claim 1, wherein actuation of at least one haptic notification element to indicate the position includes mapping the at least one object to the steering wheel.

6. The method of claim 1, wherein the actuation area of the at least one haptic notification element may be controlled to move to signal object movement.

7. The method of claim 1, wherein actuation of the at least one haptic notification element to indicate the position includes controlling the outer surface of a portion of the steering wheel associated with the detected hand position, wherein the outer surface of the portion of the steering wheel is mechanically raised.

8. The method of claim 1, wherein actuation of the at least one haptic notification element to indicate the position is based on map profile generated for an operator of the vehicle, the map profile including at least one hand profile for the operator.

9. The method of claim 1, further comprising updating actuation of the at least one haptic notification element in response to position change of the at least one object.

10. The method of claim 1, further comprising updating actuation of the at least one haptic notification element in response to rotation of the steering wheel.

11. A vehicle system comprising:
    a haptic steering wheel including a plurality of haptic notification elements, the plurality of haptic notification elements each including a plurality of actuation areas configured to be positioned to a raised height; and
    a control unit configured to
       receive a detected hand position relative to a steering wheel of the vehicle,
       detect at least one object relative to the vehicle, and
       control actuation of at least one haptic notification element of the steering wheel based on the hand position to indicate position of the at least one object relative to the vehicle, wherein actuation of the at least one haptic notification element includes partial activation of the haptic notification element to control size and position of an actuation area of the haptic element, wherein the size and position of the actuation area of the at least one haptic notification element indicates direction of the at least one object.

12. The vehicle system of claim 11, wherein the detected hand position is detected by capacitive sensors of the steering wheel.

13. The vehicle system of claim 11, wherein the detected hand position is detected by an imaging unit of the vehicle.

14. The vehicle system of claim 11, wherein detection of the at least one object includes determining relative position of the object relative to the vehicle.

15. The vehicle system of claim 11, wherein actuation of at least one haptic notification element to indicate the position includes mapping the at least one object to the steering wheel.

16. The vehicle system of claim 11, wherein the actuation area of the at least one haptic notification element may be controlled to move to signal object movement.

17. The vehicle system of claim 11, wherein actuation of the at least one haptic notification element to indicate the position includes controlling the outer surface of a portion of the steering wheel associated with the detected hand position, wherein the outer surface of the portion of the steering wheel is mechanically raised.

18. The vehicle system of claim 11, wherein actuation of the at least one haptic notification element to indicate the position is based on map profile generated for an operator of the vehicle, the map profile including at least one hand profile for the operator.

19. The vehicle system of claim 11, wherein the control unit is configured to update actuation of the at least one haptic notification element in response to position change of the at least one object.

20. The vehicle system of claim 11 wherein the control unit is configured to update actuation of the at least one haptic notification element in response to rotation of the steering wheel.

* * * * *